United States Patent Office 3,705,076
Patented Dec. 5, 1972

3,705,076
ADHESIVE COMPOSITION AND LAMINATING
PROCESS
Hugo R. Usala, Wilmington, Del., assignor to E. I. du
Pont de Nemours and Company, Wilmington, Del.
No Drawing. Continuation-in-part of application Ser. No.
218,103, Aug. 20, 1962. This application May 17, 1966,
Ser. No. 550,627
Int. Cl. B32b 27/08, 27/30
U.S. Cl. 161—189
39 Claims

ABSTRACT OF THE DISCLOSURE

A composition of an organic solvent solution of an aminoester modified vinyl addition polymer, of at least two ethylenically unsaturated copolymerizable monomers, such as methyl methacrylate and methacrylic acid, having attached to the carbon-carbon chain monovalent radicals of the formula

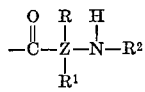

wherein
Z is an aliphatic hydrocarbon radical having 2–3 carbon atoms and R, R¹ and R² are either hydrogen or alkyl radicals and the polymer has an amino nitrogen content of at least 0.01%;
the composition is useful as an adhesive for laminating polyvinyl fluoride film to a wide variety of substrates and the composition can be used as a clear or pigmented coating composition for metal or wood substrates.

---

The present application is a continuation-in-part of copending application Ser. No. 218,103, filed on Aug. 20, 1962, now abandoned.

This invention relates to improved laminating adhesives, to laminates prepared therewith and a method for preparing such adhesives. More particularly, this invention relates to amino-ester modified vinyl polymer adhesives for laminating polyvinyl fluoride film to various substrate materials, and to a method for their preparation.

Polyvinyl fluoride film structures are noted for their excellent combination of properties such as, for example, weather resistance, abrasion resistance, solvent resistance and resistance to soiling. In addition, polyvinyl fluoride film can easily be embossed or otherwise postformed. These and other properties make polyvinyl fluoride film particularly attractive for use in laminar structures and particularly as a weather-resistant, abrasion-resistant, readily cleanable, postformed top layer thereof. However, polyvinyl fluoride film is very difficult to adhere to other materials.

Most adhesives commonly employed commercially to form laminates have relatively poor adhesive bond strengths when used for laminating polyvinyl fluoride film to substrates. Thus, a prerequisite of an adhesive for the laminates of this invention is high adhesive strength to polyvinyl fluoride film. Preferably, in polyvinyl fluoride film laminates, the intermediate adhesive layer should not only form a strong adhesive bond with the adjacent layers but, also, should have high cohesive strength. Preferably, in the case of laminar structures having a flexible layer of polyvinyl fluoride film of about 1 to 5 mil thickness, the polyvinyl fluoride film layer should fail before the intermediate adhesive layer fails either cohesively or adhesively. In such a case, if the intermediate adhesive layer does not extend quite to the edge of the laminate or, for example, if the laminate becomes partially de-laminated, and the unadhered layers are separated, one or both unadhered layers will tear at the edge of the adhesive rather than completely separate, that is, propagate the delamination.

The specialized materials which have been developed to improve bonding in laminates of polyvinyl fluoride film have been generally subject to one or more of the following disadvantages. First, many adhesives have poor weathering properties and in particular, for example, discolor on prolonger weathering. Thus, where a clear or lightly pigmented film of polyvinyl fluoride is laminated to a colored substrate, the coloring effect of the substrate is often destroyed, for example, by yellowing. Other adhesives, such as epoxy adhesives, present fabrication problems; for example, some such adhesives must be supplied in two-package systems which must be mixed just prior to fabrication while other such adhesives require prolonged curing sometimes at elevated temperature to develop appreciable bond strengths. With other polyvinyl fluoride film laminates, folding, post-forming and other fabrication techniques cause failure and delamination at the adhesive layer.

According to the present invention there is provided an adhesive composition comprising an organic solvent solution of a vinyl addition polymer, having attached to the carbon-carbon chain thereof monovalent radicals of the formula:

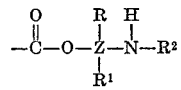

wherein Z is an aliphatic hydrocarbon radical of 2 to 3 carbon atoms, R and R¹ are selected from the group consisting of hydrogen and alkyl radicals of from 1 to 8 carbon atoms, and R² is selected from the group consisting of hydrogen and non-tertiary alkyl radicals of from 1 to 8 carbon atoms, said vinyl polymer having an amino nitrogen content of at least 0.01%, preferably 0.1 to 2.0%, based upon the total weight of said vinyl polymer.

According to the present invention there is further provided a laminar structure comprising a layer of organic polymeric material firmly adhered to a substrate by means of an interlayer therebetween of an adhesive composition comprising an amino-ester modified vinyl polymer having attached to the carbon-carbon chain thereof monovalent radicals of the formula:

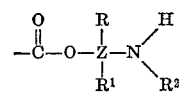

wherein Z is an aliphatic hydrocarbon radical of 2 to 3 carbon atoms, R and R¹ are selected from the group consisting of hydrogen and alkyl radicals of from 1 to 8 carbon atoms, and R² is selected from the group consisting of hydrogen and non-tertiary alkyl radicals of from 1 to 8 carbon atoms, said vinyl polymer having an amino nitrogen content of at least 0.01% by weight, based upon the total weight of said vinyl polymer.

According to the present invention there is further provided a process for preparing the above-described adhesives which comprises: reacting in an organic solvent at least two ethylenically unsaturated copolymerizable monomers, at least one of which contains free carboxyl groups or groups which can form free carboxyl groups such as, for example, anhydrides, aldehydes, ketones and esters, to produce a vinyl addition polymer having free carboxyl groups attached to the carbon-carbon chain and an acid equivalent of between about 0.01 and about 6.0 milliequivalents per gram, preferably between about 0.1 and 1.5, adding to said solution of vinyl polymer between about 100 and 300% of the theoretical amount required to completely esterify the free carboxyl groups attached to the carbon-carbon chain of said vinyl polymer of an alkylene imine having 2 to 3 carbon atoms in the cyclic ring to convert said carboxyl groups of the vinyl polymer to amino substituted ester groups.

The nature and advantages of the present invention will be more clearly understood from the following description thereof.

The adhesive composition of the present invention is an organic solvent solution of an amino-ester modified vinyl polymer. Suitable polymerizable monomers which may be used for preparing the amino-ester substituted vinyl polymer are derived from vinyl monomers characterized by a $CH_2=C<$ group, and include, for example, derivatives of alpha, beta-unsaturated acids including methyl acrylate, ethyl acrylate, propyl acrylate, tertiary-butyl acrylate, methyl methacrylate, ethyl methacrylate, butyl methacrylate, ethyl alpha-chloroacrylate, ethyl alpha-phenylacrylate, dimethyl itaconate, ethyl alpha-methoxyacrylate, propyl alpha-cyanoacrylate, hexyl alpha-methylthioacrylate, cyclohexyl alpha-phenylsulfonyl acrylate, tertiarybutyl ethacrylate, ethyl crotonate, dimethyl maleate, isopropyl cinnamate, butyl beta-methoxyacrylate, cyclohexyl beta-chloroacrylate, acrylamide, alpha-phenylacrylamide, methacrylamide, N,N-dimethylacrylamide, N-cyclohexylmethacrylamide, itaconamide, acrylonitrile, crotonitrile, alpha-chloroacrylonitrile, methacrylonitrile, alpha-phenyl acrylonitrile, N-phenyl maleimide, N-butyl itaconimide and mixtures thereof; vinyl derivatives such as vinyl acetate, vinyl benzoate, vinyl pimelate, vinyl stearate, vinyl methyl ether, vinyl butyl ether, vinyl phenyl sulfide, vinyl dodecyl sulfide, vinyl butyl sulfone, vinyl cyclohexyl sulfone, vinyl chloride, vinyl fluoride, N-vinyl benzenesulfonamide, N-vinyl acetamide, N-vinyl caprolactam, styrene and vinyl toluene; allyl derivatives such as allyl phenyl ether, allyl cyclohexylacetate, N,N-dimethylallylamine, ethyl allyloxyacetate, allylbenzene, allyl cyanide and allyl ethyl sulfide; methylene type derivatives such as diethyl methylenemalonate, diketene, ethylene glycol ketene acetal, methylene cyclopentane, vinylidene chloride and vinylidene disulfones, miscellaneous compounds such as vinylene carbonate, acrolein acetals, methyl vinyl ketones, vinyl phosphonates, allyl phosphonates, vinyl trialkoxysilanes; and unsaturated hydrocarbons such as ethylene, propylene, butadiene, and the like.

A preferred variety of the vinyl polymer of the present invention are the acrylic ester polymers containing 50 to 99% of one, or a mixture of two or more, of the acrylate or methacrylate esters derived from the lower aliphatic alcohols having 1 to 8 carbon atoms and additionally containing a sufficient proportion of a methacrylate ester having one of the following primary-amino-substituted ester radicals to provide an amino nitrogen content of from 0.1% to 2% by weight, based upon the total weight of said vinyl polymer:

(1) 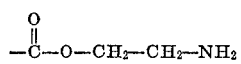

(2) 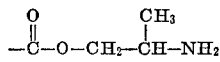

(3) 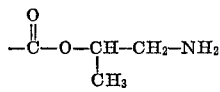

Although the preferred amino-ester modified vinyl polymers of the present invention are comprised predominantly of the lower alkyl acrylic or methacrylic esters, it should be pointed out that the composition of the bulk of the vinyl polymer is not critical. However, the aminoester substituted vinyl polymer must contain from 0.1% amino nitrogen and the amino groups must have at least one hydrogen atom attached to the amino nitrogen which is unhindered by bulky tertiary alkyl groups, such as a tertiary butyl group. If the amino groups in the ester radical of a vinyl polymer contain no hydrogen atom, i.e., the groups are tertiary, or if the amino groups are hindered, then the modified vinyl polymer will not yield the requisite adhesive having a high adhesive strength at high humidity. It is believed that the unhindered amino hydrogen atom of the modified vinyl polymers of the composition of the present invention promote adhesion through hydrogen bonding to substrate materials with which they are brought into contact.

The polymer should be at least about 5% soluble at room temperature in a volatile organic solvent having a boiling point of less than about 175° C. Preferably, the polymer is 20 to 60% soluble at room temperature in one, or a mixture of two or more, of the readily available, inexpensive, alcohols, esters, ketones, hydrocarbons or halogenated hydrocarbons having a boiling point of less than about 150° C. Polymers having very high molecular weights are, in general, too insoluble to be of practical use as solvent applied adhesives, while polymers with too low molecular weights have unsatisfactory adhesive and cohesive strength. The higher molecular weight polymers can, however, be employed to advantage in laminating processes using melt or flame spray application of the adhesive, or in the compounding of dispersions of "bake on" enamels, and the like. The low molecular weight polymers can be employed in combination with hydrophobic cross-linking agents which will greatly increase their molecular weight, and their cohesive and adhesive strength. The most satisfactory aminoester modified vinyl polymers for use as adhesives for providing very strong, weather resistant bonding between a polyvinyl fluoride film and a substrate are those polymers having a glass transition temperature in the range of 40 to 125° C. However, those polymers having low glass transition temperatures in the range of from −60 to 40° C. are quite useful as high strength, water resistant pressure sensitive adhesives, or for combining with cross-linking adhesive agents, for example, an epoxy resin or an organic diisocyanate, to provide curable adhesive compositions for use in the preparation of weather resistant polyvinyl fluoride laminates. Such low glass transition temperature polymers can be modified to produce an adhesive having good adhesive and and cohesive strength by mixing them with polymers having high glass transition temperatures.

An essential structural feature of the aminoester vinyl polymers of this invention is that they contain amino groups which bear at least one hydrogen atom which is unhindered by a bulky tertiary alkyl radical, such as a t-butyl group, attached to the amino nitrogen atom. Another structural feature which appears to contribute to high adhesive ability of these polymers is that the hydrogen bearing amino groups are situated a considerable distance removed from the carbon-carbon chain of the polymer molecule. It is believed that the hydrogen atom of the amino groups promotes adhesion by hydrogen bonding to active sites on the surface of the materials which they contact. The polymers of this invention are outstanding adhesives because the hydrogens of the amino groups are readily accessible for hydrogen bonding, since they are unhindered and are flexibly attached through the ester radical to the polymer at an appreciable distance from the more rigidly fixed polymer chain. The unusually high degree of hydrolytic stability, i.e., resistance to water, which these polymer adhesives possess is due to the shielding effect provided by the polymer chain which contains no moisture attracting linking atoms, such as oxygen, nitrogen, or sulfur, but is hydrocarbon in nature, hence, rather hydrophobic.

Not only is it necessary that the amino groups of the aminoester modified vinyl polymers of this invention have unhindered hydrogen atoms, but it is also preferred that the polymer contain at least about 0.1% amino nitrogen to provide the high adhesive strength required for polyvinyl fluoride film laminates. However, it should be pointed out that aminoester modified vinyl polymers containing 0.01 to 0.1% amino nitrogen have considerably better adhesive properties than the corresponding unmodified vinyl polymers. In general, polymers having more than about 2.0% amino nitrogen content have good adhesive properties in the absence of moisture, but lose much of their adhesive strength in the presence of moisture, particularly at high temperatures. Apparently, a large number of excess amino groups in the polymer molecule appreciably increase its affinity for water, although the polymer is insoluble in water. It should be pointed out, however, that when mixed with cross linking agents, such as epoxide resins or organic diisocyanates, such polymers are rendered insensitive to water.

In general, it is preferred that the aminoester modified vinyl polymer have not free carboxyl groups attached to the polymer chain or an alkyl radical attached to the amino nitrogen.

The preferred general procedure for preparing the amino-ester modified vinyl polymer adhesives of the present invention is to first prepare a vinyl polymer having sufficient free carboxyl groups attached to the polymer chain to cause the polymers to have an acid milliequivalent per gram of 0.1 to 1.5, then to esterify a portion, or all, of the free carboxyl groups by reacting the polymer with 1.0 to 3.0 molar equivalents of an alkylene imine having 2 to 3 carbon atoms in the cyclic ring to yield a polymer having an amino nitrogen content of 0.1 to 2.0%.

The intermediate acid polymers are preferably prepared by combining an alpha, beta-ethylenically unsaturated acid with one or more copolymerizable vinyl monomers in a relatively low boiling (75–150° C.) organic solvent to obtain a 20 to 60% solution of the monomer mixture, then subsequently causing the monomers to polymerize by the addition of a polymerization catalyst and heating the mixture at the reflux temperature of the solution at atmospheric pressure while excluding oxygen from the system by continuously purging the reaction vessel with nitrogen or other inert gases. After the polymerization reaction is essentially complete, the resulting acid polymer solution is cooled to room temperature and samples are removed to determine the viscosity, molecular weight, acid equivalent, etc. of the polymer.

The generally preferred acid monomers for introducing carboxyl groups into vinyl polymers for subsequent conversion to aminoester groups are the alpha, beta-monoethylenically unsaturated monocarboxylic acids, such as acrylic, methacrylic, crotonic and 3-butenoic acids, of which acrylic and methacrylic are particularly preferred. It should be clearly understood, however, that polymerizable unsaturated dicarboxylic acids, such as, for example, itaconic, citraconic and maleic acids, can be employed, or the anhydrides of such acids can be introduced into the vinyl polymer and later hydrolyzed to provide the necessary free carboxyl groups.

Esterification of the free carboxyl groups of the polymer is then accomplished by adding an appropriate quantity of an alkylene imine to the cool solution, thoroughly agitating the cool solution for about 15 to 60 minutes, then completing the esterificating by heating the solution at 60° C. for about 3 to 6 hours. The resulting aminoester modified polymer solution is then cooled to room temperature, samples are taken for combined amino nitrogen determination, then the solution is stored without further modification or purification until needed for use as an adhesive composition in the preparation of laminar structures. Such solutions are quite stable for long periods of time and show little tendency toward gellation, even though they may contain traces of unreacted monomers and nitrogenous by-products, in addition to small amounts of decomposition products from the polymerization catalyst. Also, the aminoester groups attached to the vinyl polymer molecule show no tendency to yield hydroxy substituted amide groups as is known to occur with aminoesters of monomeric acids (see J.A.C.S., vol. 73, p. 5773; J.A.C.S., vol. 78, p. 907; and J. Org. Chem,, vol. 9, p. 502). Apparently, steric hindrance of the polymer chain prevents rearrangement of the amide to occur, hence these adhesives retain their good adhesive properties even after long storage.

It should be pointed out that it is quite contrary to expectation that alkylene imines would react with the carboxyl groups of vinyl polymers to yield the aminoester modified polymers of this invention, in view of the great tendency alkylene imines have to homopolymerize in the presence of even a weak acid, such as carbonic (see Interchemical Corporation's New Product Bulletin "Propylene Imine," p. 2). Furthermore, it is quite unexpected that the iminated polymer product of this invention yield solutions having satisfactory viscosities rather than highly viscous solutions or gelatinous masses, since crosslinking between the polymer chains during the imination reaction might well be expected to occur. Thus, an essential feature of the present invention is the discovery of the critical requirement that the molar equivalent of alkylene imine must be at least 1.0.

From the foregoing description, it can be seen that the adhesive polymer of this invention can be prepared quite quickly, easily and economically either in large or small scale batches, since no highly specialized techniques or equipment are needed. This is in contrast with known methods for preparing aminoester modified vinyl polymers; for example, by the ammoniation of glycidyl methacrylate polymers, which require a prolonged, high pressure reaction to introduce the amino group, followed by vacuum stripping to remove excess ammonia (U.S. Pat. 2,949,445).

The preferred class of alkylene imines for converting free carboxyl groups of a vinyl polymer into aminoester groups are the 1,2-alkylene imines (aziridines) having a free hydrogen attached to the nitrogen atom; and of these imines, ethylenimine and 1,2-propylenimine are particularly preferred, because of their availability and relatively low cost. The N-alkyl substituted 1,2-alkylene imines may also be used. If desired, the N-alkyl substituted or unsubstituted 1,3-alkylene imines (azetidines) can be used to provide the aminoester groups, since such imines are similar to the 1,2-imines in their chemical reactivity and properties. Examples of these compounds include 2-methyl aziridine, 2-ethyl aziridine, 2-n-propyl aziridine, 2-isopropyl aziridine, 2-n-butyl aziridine, 2-isobutyl aziridine, 2-sec. butylaziridine, 2-(1-methyl butyl)aziridine, 2-(2-methyl butyl)aziridine, 2-(3-methyl butyl)aziridine, 2-n-pentyl aziridine, 2-(1-methyl pentyl)aziridine, 2-(3-methyl pentyl)aziridine, 2-(4-methyl pentyl)aziridine, 2-(3-ethyl pentyl)aziridine, 2-(2-isopropyl pentyl)aziridine, 2-n-hexyl aziridine, 2-n-heptyl aziridine, 2-n-octyl aziridine, 2,3-dimethyl aziridine, 2,3-di(2-methylbutyl)aziridine, 2-ethyl-3-n-hexyl aziridine, 2-n-octyl-3-propyl aziridine and the corresponding azetidines, for example: 2-methyl azetidine, 2-ethyl azetidine, 2-n-propyl azetidine, 2,4-dimethyl azetidine, 2,4-di-n-octyl azetidine, 2,3-di(2-methylbutyl)azetidine.

Although it is preferred that the aminoester substituted vinyl polymer of this invention be prepared from preformed vinyl polymers, containing no amino groups but having reactive groups which are convertible into aminoester groups, it should be pointed out that the vinyl polymers of this invention also can be prepared directly from monomer mixtures containing a monomer having the desired aminoester groups. Although it is preferred that the polymerization charge include one of the many vinyl polymerization catalysts known to the art, such as an azo compound or organic peroxy compound, for example, 2,2'-azodiisobutyronitrile or cumene hydroperoxide, the polymerization can be conducted without a catalyst if the length of time required to complete the reaction is of no great concert. If desired, the preformed acid polymer can be prepared by emulsion polymerization of the vinyl monomer in water or some other non-solvent, then recovered and dissolved in an organic solvent prior to being esterified by reaction with an alkylene imine.

Because of its low cost, high volatility, and good solvent power, the preferred solvent for the adhesive polymers of this invention is a mixture of isopropyl alcohol and toluene in the ratio by weight of about 30 to 70; however, the nature of the solvent is not critical. Other suitable solvents which can be used, either individually or in mixtures, include the common alcohols, esters, ketones, aromatic hydrocarbons, and halogenated hydrocarbons. For example: methyl, ethyl, n-propyl, n-butyl and higher alkyl alcohols; methyl, ethyl, propyl, butyl and higher alkyl acetates and propionates; acetone, methylethyl and diethyl ketones; benzene and the xylenes; and, ethylene chloride, chloroform and carbon tetrachloride.

The polyvinyl fluoride layer used in the laminates of this invention is preferably in the form of a sheet or film. Such sheets and films of polyvinyl fluoride can be formed by known procedures such as those described in U.S. Pats. 2,953,818 and 3,139,470. One method of forming such sheets and films comprises feeding a mixture of latent solvent and polyvinyl fluoride to a heated extruder which is connected to a slotted casting hopper. A tough coalesced extrudate of polyvinyl fluoride is extruded continuously in the form of a sheet or film containing latent solvent. The sheet or film can be merely dried or, alternately, it can be heated and stretched in one or more directions while solvent is volatilized therefrom. Sheets and films of polyvinyl fluoride also can be cast from dilute hot solutions of the polymer in latent solvent as described in U.S. Pats. 2,419,008 and 2,419,010. If desired, various color and opacity effects can be achieved by incorporating pigments and fillers in the polyvinyl fluoride film during the manufacture thereof. Examples of pigments and fillers are metallic oxides, hydroxides, chromates, silicates, sulfides, sulfates and carbonates, organic dyes and flakes thereof and carbon blacks.

Each surface of the polyvinyl fluoride film which is to be adhered to itself or to another substrate layer is activated, that is, is made surface receptive. The surface of polyvinyl fluoride sheets and films are activated in any suitable way such as, for example: exposing the film to a gaseous Lewis acid such as boron trifluoride, aluminum trichloride or titanium tetrachloride or a liquid composition containing a coordnation complex thereof; exposing the film to concentrated sulfuric acid, fuming sulfuric acid, sulfur trioxide or hot sodium hydroxide; exposing one surface of the sheet or film to an open flame while cooling the opposite surface; and subjecting the subjecting the film to a high frequency electrical discharge.

In particular, for example, sheets or films of polyvinyl fluoride may be passed through a treating chamber lined with stainless steel and containing a gaseous mixture consisting of from about 1% to 90% by volume of boron trifluoride held at a temperature of from about 20° C. to 75° C. for a dwell time in the chamber of about 3 to 30 seconds. After the treatment with the boron trifluoride, the resulting film is either washed in ammonium hydroxide or water and then air dried or merely washed in water and air dried or heated for a brief period at a temperature of about from 100° C. to 150° C.

Another procedure for treating the surface of polyvinyl fluoride is to contact at least one surface thereof with either concentrated sulfuric acid, fuming sulfuric acid or sulfur trioxide for a time of from about 2 seconds to about 1 minute. After said treatment, the film is washed in water and air dried. Preferably, the acid solution is held at a slightly elevated temperature, for example, about 25° C. to 95° C.; less contact time is required when higher temperatures are used.

Still another procedure is to immerse the polyvinyl fluoride sheet or film in a boron trifluoride-ethyl etherate complex followed by washing with water, acetone or ethyl ether and then air drying the treated film. Alternatively, since boron trifluoride coordinates or complexes with a wide variety of organic compounds, particularly amines and oxygen-containing compounds such as ethers, alcohols, esters, acids and amides, complexes other than that with diethyl ether can be employed to chemically activate films of polyvinyl fluoride. For example, the complexes of boron trifluoride with dimethyl ether, methyl-ethyl-ether and phenol are particularly useful because they, like the diethyl ether complex, are liquids at room temperature. Slightly elevated temperatures are preferably employed to increase the rate of dissociation of the complex, thus shortening the immersion time necessary to effect a satisfactory degree of chemical activation.

A still further example of a method for activating the surface of polyvinyl fluoride is to pass a sheet or film thereof at a rate of about 100 to 250 feet per minute over and in contact with a chilled metal drum while the exposed surface of the sheet or film that is not in contact with the drum passes through a flame as, for example, a flame of a gas burner fueled with a gaseous mixture of propane and air having a weight ratio of propane-to-air of about 1:25.

A still further method for activating polyvinyl fluoride is to subject the surface thereof to high frequency electrical discharge, preferably in an atmosphere of, for example, nitrogen, ammonia, boron, trifluoride, oxygen or air. This may be done, for example, by passing a sheet or film of polyvinyl fluoride at a rate of about from 10 to 300 feet per minute over and in contact with a grounded metal drum while the surface away from the drum passes under and in close proximity to, for example, about 0.010 to 0.025 inch, an electrode that is connected to a source of high frequency alternating potential.

Examples of suitable substrates include metal substrates such as cold rolled steel, iron, galvanized iron and steel, aluminum, aluminized steel, chromium, bronze, brass, lead, tin and nickel and various other alloys; glass and other vitreous substrates such as those of porcelain and china; impregnated substrates such as asphalt-impregnated cellulosics; hardboards such as "Masonite"; cement-asbestos boards, wood substrates such as those of birch, oak, fir, pine, hemlock, cedar, redwood, poplar, and ash as well as the plywoods for use as siding and roofing for houses and other building structures; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetates. Laminations to metal and wooden substrates can be employed in the manufacture of outdoor signs, wall tile, wall and ceiling paneling, venetian blinds, interior partitioning, awnings, ductwork, counter- and table-tops, store fronts, rain gutters and downspouts. Laminations to metal, particularly of pigmented polyvinyl fluoride films, can be postformed and employed to replace enameled and baked wall, ceiling, floor and side members of applications such as refrigerators, freezers, air conditioners, dehumidifiers, hot-water heaters, washers and dryers, kitchen cupboards and cabinets. In the automotive field, laminations of metallized and pigmented polyvinyl fluoride films to metal substrates can be employed variously as automobile door and side paneling, hard tops, molding, interior and exterior trim, instrument paneling, wheel covers and hub caps, siding and tops for house trailers and truck and van bodies.

Prior to lamination, metallic substrates may and usually are given a conventional passivation or corrosion-inhibiting treatment such as that used commercially to prepare substrates for painting. Laminar structures of polyvinyl chloride to coated or uncoated fabrics or to polymeric films may serve as headliners, seat covers, floor mats and truck liners. Other uses for the laminates of this invention include upholstery, floor coverings, lamp shades and book bindings. Of course, a second layer of polyvinyl fluoride also can be used as substrates.

Laminates of this invention are prepared by coating an organic solvent solution of the adhesive polymer on one or both surfaces of each pair of surfaces to be adhered, drying the adhesive to remove solvent therein, and heating the resulting product to above its glass transition temperature, that is, above the temperature at which the adhesive will flow under pressure, and preferably to about from 50 to 200° C. above its glass transition temperature. The surfaces to be adhered by the adhesive composition are brought together and the resulting product is pressed while the adhesive is maintained at about the above temperatures. With the preferred acrylic polymers, one method for forming a laminate of this invention comprises, for example, coating the adhesive onto the substrate, partially drying the adhesive at room temperature for about 10 seconds to 60 minutes, heating the coated substrate at a temperature of about from 125 to 300° C. for about from 300 to 10 seconds, and preferably about from 150 to 250° C. for about from 120 to 10 seconds, then immediately applying a preformed layer of polyvinyl fluoride to the hot adhesive and passing the resulting structure through nip rolls. Alternately, instead of or in addition to using nip rolls, the structure with hot adhesive can be inserted in a press and held at a temperature of about from 150 to 75° C. for about from 1 to 15 minutes under a pressure sufficient to bring the layers to be adhered into intimate contact and preferably of about 25 to 500 pounds per square inch.

The laminates of this invention can consist of a layer of polyvinyl fluoride and a substrate adhered with a layer of the aforementioned adhesive. Also, the layer of polyvinyl fluoride and a substrate can be adhered with a layer of adhesive comprising blends of the adhesives of this invention or an adhesive of this invention blended with anti-oxidants, corrosions inhibitors, pigments, delustering agents, ultraviolet light absorbers, other adhesives, cross-linking agents and the like. Alternately, however, the laminates of this invention can, of course, comprise two or more layers of polyvinyl fluoride adhered with intermediate adhesive layers of this invention. Also, several alternate layers of the substrate and polyvinyl fluoride can be adhered with adhesive layers. Substrates comprising two or more layers, for example, plywood or coated fabrics can also be used.

The products of this invention have outstanding weather resistance and abrasion resistance and can easily be cleaned. In addition, they have excellent interlayer adhesion and also good resistance to delamination by failure at the intermediate adhesive layer even upon prolonged exposure to boiling water. Products of this invention comprising a formable substrate, such as a coated fabric or sheet metal, can be easily postformed into intricate shapes without delamination, even before the adhesive is completely cured. If desired, pigments, corrosion inhibitors or U.V. light adsorbers (such as, for example, $TiO_2$, carbon black, basic zinc chromate) and the like can be incorporated into the adhesive layer to improve the weathering properties of the laminated structures or to improve their appearance or to impart some other desirable property. Incorporating an antioxidant or ultraviolet light adsorber compound into the adhesive layer is especially desirable where clear polyvinyl fluoride film is laminated to plywood.

The products of this invention because of their excellent combination of weather resistance, abrasion resistance, solvent resistance, formability and excellent interlayer adhesion find ready use in many fiields. In the construction field, both pigmented and clear polyvinyl fluoride films can be laminated to such substrates as cold rolled steel, galvanized and/or aluminized steel, aluminum, plywood, hardboards such as "Masonite," cement-asbestos boards and asphalt-impregnated cellulosic boards for use as sliding and/or roofing for houses and other domestic structures as well as for commercial, institutional and industrial buildings. Laminations to metal and wooden substrates can be employed in the manufacture of outdoor signs, wall tile, wall and ceiling paneling, venetian blinds, interior partitioning, awnings, ductwork, counter- and table-tops, store fronts, rain gutters and downspouts. Laminations to metal, particularly of pigmented polyvinyl fluoride films, can be postformed and employed to replace enameled and baked wall, ceiling, floor and side members of appliances, dehumidifiers, hot-water heaters, washers and dryers, kitchen cupboards and cabinets. In the automotive field, laminations of clear, metallized and pigmented polyvinyl fluoride films to metal substrates can be employed variously as automobile door and side paneling, hard tops, moldings, interior and exterior trim.

The principle and practice of the present invention will now be illustrated by the following examples which are provided to show the practice and use thereof, but it is not intended that the invention be limited thereto since modifications in technique and operation will be apparent to anyone skilled in the art.

The test samples of laminar structures prepared in the following examples were evaluated in accordance with the following testing procedures:

Adhesive bond strength.—Adhesive bond strength is a measure of the ease of removing polyvinyl fluoride film from a substrate after the adhesive has set. The test is conducted by cutting through the film layer of the laminate with a razor blade in a number of lines ⅛ inch apart, cutting the ends of the resulting section of film away from the substrate, then attempting to strip the individual sections of film away from the substrate with a pair of tweezers. If the ⅛ inch sections of film can be stripped from the substrate, the adhesive is unsatisfactory for use in the continuous production of weather-resistant laminates, which is designated as NO, while if the film sections cannot be stripped loose from the substrate, but break instead, the bonding is considered satisfactory and is designated CNS (cannot be stripped). (In the special cases in which a pressure sentitive adhesive is used, the adhesive bond strength is expressed as the force in grams/inch, applied at an angle of 90°, required to separate the polyvinyl fluoride film from the substrate).

The boiling water immersion.—The boiling water immersion test is an evaluation of the adhesive bond strength of a laminate after the laminate has been exposed continuously to boiling water for a period of time. To conduct the test, a series of samples are exposed to boiling water and from time to time a sample is removed and tested as described above and examined for blisters. The results are expressed as the length of time the sample retained CNS bonding and developed no blisters. A laminate must withstand at least 168 hours exposure to boiling water to be satisfactory. (Prior art laminates usually fail after about 1 to 5 hours exposure to boiling water).

The weather-ometer.—This test is an accelerated weathering test in which a Type HVDL–X Atlas Weather-Ometer is employed. To conduct the test, the laminate sample is subjected alternately to an hour of water spray in darkness, two hours of light from twin carbon arcs, to two hours of water spray in darkness and then to 6 more hours of light from the carbon arcs, then the cycle is repeated. The results are expressed as the length of time the samples withstand this test without blistering or loss of CNS bonding.

The fog chamber test.—This test is a measure of the ability of a laminate to withstand a high temperature and high humidity environment. To conduct the test, laminate samples are placed in a closed chest and exposed to 100° F. and 100% relative humidity and, from time-to-time, a sample is removed and examined for blisters and the adhesive bond strength determined. The results are expressed as the length of time the sample was exposed without developing blisters and/or loss of CNS bonding.

Postformability.—This test consists of "dimple" forming the laminate using 1″ and ⅜″ diameter ball bearings. The curvature is then sliced with a razor and an attempt is made to peel the film from the metal substrate. Laminates with good postformability (OK) will not peel.

EXAMPLE 1

The following ingredients are charged into a reactor vessel, fitted with a stirrer, reflux condenser, thermometer and nitrogen inlet tube:

| | Parts |
|---|---|
| Methyl methacrylate | 97 |
| Methacrylic acid | 3 |
| Toluene | 105 |
| Isopropanol | 45 |

The mixture is stirred and heat at atmospheric pressure under a blanket of nitrogen at the reflux temperature of the solvent mixture (88° C.) for three hours, then 0.1 part of alpha, alpha-azobisisobutyronitrile dissolved in 10 parts of 70/30 mixture of toluene and isopropanol is added to the reaction mixture and polymerization is continued for another three hours. The resulting polymer solution is then cooled to room temperatures and diluted by the addition of 125 parts of a 70/30 toluene/isopropanol mixture. The resulting polymer has an inherent viscosity of 0.17 measured in an 0.5% solution of toluene and an acid equivalent of 0.349 miliequivalents per gram.

To the cool polymer solution is added 3 parts of 1,2-propylenimine and the resulting mixture is stirred for one hour at room temperature. The temperature is subsequently increased to 88° C. and the mixture is stirred for 5 hours, then the resulting aminoester modified vinyl polymer solution is cooled to room temperature. The solution is found to contain 29.26% polymer solids and an inherent viscosity of 0.37 in an 0.5% solution of toluene. A sample of polymer isolated from the solution is found to have 0.48% combined amino nitrogen.

This aminoester modified polymer solution is used without further modification as an adhesive composition in the lamination of 2 mil thick, biaxially oriented, titanium dioxide pigmented polyvinyl fluoride film to 25 mil thick aluminum sheets in the following manner:

The surface of the polyvinyl fluoride film is made surface receptive by holding it for 10–20 seconds in an atmosphere containing a gaseous mixture of air and 1 to 10% by volume of boron trifluoride at 25 to 35° C. Finally, the film is washed with 5% aqueous ammonium hydroxide, then washed with water and dried. One surface of the aluminum sheets is treated with a solution of "Bonderite" 72 1 (Parker Rust Proof Corp.) to provide an amorphous chromium aluminum oxide coating to inhibit corrosion and improve adhesion. After drying the "Bonderite" treated surface of the aluminum, an 0.4 mil thick (dry basis) of the adhesive solution is applied, the adhesive solvent allowed to evaporate in air at room temperature for 5 minutes, then the aluminum sheet is placed in a ventilated oven at 250° C. for about 1½ minutes to completely remove the adhesive solvent. Immediately after removing the aluminum sheet from the oven, the BF₃ treated surface of the film is placed into contact with the molten adhesive covered surface of the aluminum, then the plied structure is passed between two press rolls set at about 100 lb./in.² pressure to force the two layers into intimate contact and exclude air. After cooling, the resulting laminate is subjected to various tests to evaluate the bonding properties of the adhesive and the weather-resistance of the laminate. The results are as follows:

Adhesive Bond Strength Test—CNS
Boiling Water Immersion Test—168+ hours
Weather-Ometer Test—1000+ hours
Fog Chamber Test—6+ weeks
Postformability Test—OK

EXAMPLE 2

The following ingredients are charged into a reaction vessel, fitted with a stirrer, reflux condenser, thermometer and nitrogen inlet tube, and the mixture is heated at the reflux temperature of the solvent for 7½ hours under a nitrogen blanket:

| | Parts |
|---|---|
| Styrene | 15 |
| Butyl acrylate | 78 |
| Methacrylic acid | 7 |
| Toluene | 100 |
| Alpha, alpha-azobisisobutyronitrile: | |
| Initially | 0.15 |
| After 3 hours | 0.10 |

After the polymerization reaction is completed, the resulting solution is cooled to room temperature, then to the cool polymer solution is added 7 parts of ethylenimine in 10 parts of toluene and the mixture is stirred for one hour at room temperature, then for five hours at 70° C. After being cooled the resulting solution is found to have an inherent viscosity of 0.30 in 0.5% solution in toluene, an acid equivalent of 0.815 milliequivalents per gram and a polymer solids content of 46.5%. The combined amino nitrogen content of the polymer is 1.10%.

Pressure sensitive polyvinyl fluoride tape is prepared by applying a 12 mil thick layer of this adhesive solution to one surface of a transparent polyvinyl fluoride film, which had previously been made surface receptive by exposure to a high voltage electrical discharge, then drying at 80° C. to remove the adhesive solvent. Samples of the resulting tape are then pressed firmly against various types of materials including paper, polyethylene, unpainted plywood, galvanized steel, aluminum, varnished wood and polyvinyl fluoride film, and in each instance the tape is found to be tenaciously bound to the material. For example, a force of 4,320 gm./in.² applied at an angle of 90° is required to peel the tape from the polyvinyl fluoride film at 0° C. For the sake of comparison, a piece of ordinary office variety pressure sensitive tape is applied in the same manner to a polyvinyl fluoride film and a force of only 1,630 gm./in.² is required to separate the tape and film. The polyvinyl fluoride pressure sensitive tape is also found to retain its superior adhesive properties upon prolonged exposure to conditions of high humidity.

EXAMPLES 3 TO 18

Other adhesive compositions are prepared, using procedures similar to that described in Example 1, by combining various vinyl monomers in an organic solvent, polymerizing the monomer mixture in the presence of a suitable catalyst to form vinyl polymer containing free carboxyl groups, then esterifying a portion or all of the free carboxyl groups by reacting the polymer with 1.0 to 3 mole equivalent of a monomeric alkylene imine. Each of the resulting aminoester modified polymer solution is then diluted to 20 to 30% with a volatile organic solvent and is used in the preparation of laminates of polyvinyl fluoride films with sheets of the following materials: galvanized steel, aluminum, plywood and polyvinyl fluoride film. Prior to the lamination, the surface of the film is activated by a brief exposure to a propane flame, while the surface of the galvanized steel is primed in the usual manner by treatment with a zinc phosphate solution, while the surface of the aluminum is primed as described in Example 1. Lamination is then accomplished by applying a thin layer of an adhesive solution uniformly on the substrate surface sufficient to deposit about 0.2 to 3 mils of aminoester modified vinyl polymer, the solvent is then removed by heating the substrate material in an oven at a temperature of 160 to 250° C., then the flame treated polyvinyl fluoride film is immediately pressed firmly against the adhesive coated substrate. The resulting laminate sample is then tested to evaluate the usefulness of the adhesive in the production of weather resistant laminates. The details of the preparation of the adhesive polymers and the laminate test results are given in the following tables:

$R^2$ is selected from the group consisting of hydrogen and non-tertiary alkyl radicals of from 1 to 8 carbon atoms, said vinyl polymer having an amino nitrogen content of at least about 0.01%, based upon the total weight of said vinyl polymer.

2. The adhesive composition of claim 1 wherein said aminoester modified vinyl polymer is an acrylic-ester polymer having an amino nitrogen content of between about 0.1% and about 6.5% by weight, based upon the total weight of said aminoester modified vinyl polymer.

3. An adhesive composition comprising an organic sol-

AMINOESTER MODIFIED VINYL POLYMER

| Example Number | Preformed polymer | | Alkylene imine | Percent N (amino) | Inherent viscosity |
|---|---|---|---|---|---|
| | Monomer [1] and ratio (parts by weight) | Acid equivalent (meq./gm.) | | | |
| 3 | 2EHA/MMA/MAA, 20/74/6 | 0.70 | 1,2-propylenimine | 0.94 | 0.32 |
| 4 | BMA/MMA/MAA, 50/48/4 | 0.46 | do | 0.63 | 0.37 |
| 5 [2] | BA/MAA, 93/7 | 0.815 | do | 1.09 | |
| 6 [2] | B/S/MAA, 67/30/3 | 0.349 | do | 0.48 | |
| 7 | BMA/MMA/MAA, 45/45/10 | 1.17 | Ethylenimine | 1.55 | 0.24 |
| 8 | MMA/MAA, 97/3 | 0.349 | N-methylethylenimine | 0.48 | 0.38 |
| 9 | MMA/MAA, 97/3 | 0.349 | 1,3-propylenimine | 0.48 | 0.36 |
| 10 [3] | MMA/MAA, 51/49 | 5.71 | Ethylenimine | 6.44 | 0.37 |
| 11 | MMA/MAA, 99/1 | 0.117 | Propylenimine | 0.16 | 0.25 |
| 12 | MMA/MAA, 99/1 | 0.117 | Ethylenimine | 0.16 | 0.20 |
| 13 | S/AN/MAA, 65/30/5 | 0.58 | Propylenimine | 0.78 | 0.68 |
| 14 | BMA/S/AN/MAA, 38/40/15/7 | 0.815 | do | 1.09 | 0.75 |
| 15 [2] | E/MAA, 90/10 | 1.17 | do | 1.54 | |
| 16 | MMA/MAA, 97/3 | 0.349 | N-(n-octyl)1,2-propylenimine | 0.46 | 0.36 |
| 17 | MMA/MAA, 97/3 | 0.349 | 2(n-octyl)ethylenimine | 0.46 | 0.38 |
| 18 | MMA/AA, 97/3 | 0.416 | 1,2-propylenimine | 0.56 | 0.33 |
| Control-A | MMA/DMAEMA, 97/3 | None | None | 0.27 | |
| Control-B | MMA/t-BAEMA, 93/7 | None | do | 0.53 | 0.18 |
| Control-C | MMA/MAA, 97/3 | 0.351 | do | None | |

[1] The monomers are abbreviated as follows: 2EHA=2-ethylhexyl acrylate; MMA=methyl methacrylate, MAA=methacrylic acid; BMA=n-butyl methacrylate; BA=n-butyl acrylate; B=butadiene; S=styrene; AA=acrylic acid; AN=acrylonitrile; E=ethylene; DMAEMA=dimethyl aminoethyl methacrylate; t-BAEMA=t-butyl aminoethyl methacrylate.
[2] These adhesives are pressure sensitive.
[3] The adhesive composition of this example is modified before use by incorporating 20% (based on the weight of aminoester modified vinyl polymer) of an epoxy resin ("Epon" 834 sold by Shell Chem. Co.) as a cross linking agent.

LAMINATE TEST RESULTS

| Example Number | Substrate material | Adhesive bond strength | Boiling water immersion (hours) | Postformability |
|---|---|---|---|---|
| 3 | Aluminum | CNS | 168+ | OK |
| 4 | do | CNS | 168+ | OK |
| 5 | Plywood | CNS | 168+ | OK |
| 6 | PVF film | [1] 540 | | OK |
| 7 | Aluminum | [1] 900 | | OK |
| 8 | Galvanized steel | CNS | 216+ | OK |
| 9 | do | CNS | 168+ | OK |
| 10 | Aluminum | CNS | 168+ | OK |
| 11 | do | CNS | 168+ | OK |
| 12 | do | CNS | 168+ | OK |
| 13 | Galvanized steel | CNS | 168+ | OK |
| 14 | Aluminum | CNS | 168+ | OK |
| 15 | do | CNS | 168+ | OK |
| 16 | PVF film | [1] 1,900 | | OK |
| 17 | Galvanized steel | CNS | 168+ | OK |
| 18 | Aluminum | CNS | 168+ | OK |
| 19 | Plywood | CNS | 168+ | OK |
| Control-A | Aluminum | Polyvinyl fluoride film and substrates were not adhered during lamination. | | |
| Control-B | do | Polyvinyl fluoride film and substrates were not adhered during lamination. | | |
| Control-C | do | Polyvinyl fluoride film and substrates were not adhered during lamination. | | |

[1] Grams per inch.

What is claimed is:

1. An adhesive composition comprising an organic solvent solution of an aminoester modified vinyl addition polymer, of at least two ethylenically unsaturated copolymerizable monomers, having attached to the carbon-carbon chain monovalent radicals of the formula:

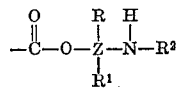

wherein

Z is an aliphatic hydrocarbon radical of from 2 to 3 carbon atoms,

R and $R^1$ are selected from the group consisting of hydrogen and alkyl radicals of from 1 to 8 carbon atoms, and vent solution of an aminoester modified vinyl addition polymer wherein said aminoester modified vinyl polymer is a copolymer of methacrylic acid, methyl methacrylate and ethyl or butyl acrylate and having attached to the carbon-carbon chain monovalent radicals of the formula:

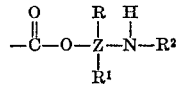

wherein Z is an aliphatic hydrocarbon radical having 2 to 3 carbon atoms, R and $R^1$ are selected from the group consisting of hydrogen and alkyl radicals having 1 to 8 carbon atoms, and $R^2$ is selected from the group consisting of hydrogen and non-tertiary alkyl radicals having 1 to 8 carbon atoms, said vinyl polymer having an amino nitrogen content of between about 0.01% and about 6.5% by weight based upon the total weight of said aminoester modified vinyl polymer.

4. The composition of claim 3 wherein the monovalent radical attached to the carbon chain is of the formula:

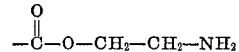

5. The composition of claim 3 wherein the monovalent radical attached to the carbon chain is of the formula:

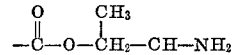

6. The composition of claim 3 wherein the monovalent radical attached to the carbon chain is of the formula:

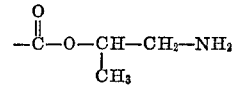

7. A composition comprising an organic solvent solution of a vinyl addition polymer of methacrylic acid, methyl methacrylate and ethyl or butyl acrylate having attached to the carbon chain thereof monovalent radicals of the formula:

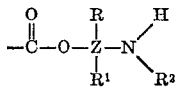

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen and alkyl radicals of from 1 to 8 carbon atoms, and $R^2$ is selected from the group consisting of hydrogen and non-tertiary alkyl radicals of from 1 to 8 carbon atoms, said vinyl addition polymer having an amino nitrogen content of between about 0.1% and about 6.5% by weight, based upon the total weight of said vinyl addition polymer.

8. The process comprising reacting in a liquid medium at least two ethylenically unsaturated copolymerizable monomers, at least one of which contains free carboxyl groups, to produce a vinyl addition polymer having free carboxyl groups attached to the carbon-carbon chain such that the acid equivalent of the polymer is within the range of about 0.01 to 6.0 milliequivalents per gram and reacting said vinyl addition polymer with about 100 to 300% of the theoretical amount required to substantially completely esterify said free carboxyl groups of an alkylene imine having 2 to 3 carbon atoms in the cyclic ring to convert said carboxyl groups of the vinyl polymer to amino substituted ester groups.

9. The process of claim 8 wherein the alkylene imine is ethylenimine.

10. The process of claim 8 wherein the alkylene imine is 1,2-propylenimine.

11. The process comprising copolymerizing in an inert atmosphere and in an organic solvent an alpha, beta-ethylenically unsaturated acid and at least one other vinyl monomer at the reflux temperature of said solvent, to produce a 20 to 60% solution of a vinyl addition polymer having free carboxyl groups attached to the carbon-carbon chain such that the acid equivalent of the polymer is within the range of about 0.1 to 1.5 milliequivalents per gram and reacting said polymer with about 100% to 150% of the theoretical amount required to substantially completely esterify said free carboxyl groups of a 1,2-alkylene imine.

12. The process of claim 11 wherein the 1,2-alkylene imine is ethylenimine.

13. The process of claim 11 wherein the 1,2-alkylene imine is 1,2-propylenimine.

14. The process of claim 11 wherein the alpha, beta-ethylenically unsaturated acid is methacrylic acid.

15. The process comprising copolymerizing in a nitrogen atmosphere and in solvent mixture of toluene and isopropyl alcohol in a 70 to 30 weight ratio, methyl methacrylate and methacrylic acid, to produce a 20 to 60% solution of a methacrylate polymer having free carboxyl groups attached to the carbon-carbon chain such the acid equivalent of the polymer is within the range of about 0.1 to 1.5 milliequivalents per gram and reacting said polymer with about 100% to 150% of the theoretical amount required to completely esterify said free carboxyl groups of a 1,2-alkylene imine having 2 to 3 carbon atoms in the cyclic ring to produce an aminoester modified methacrylate polymer having an amino nitrogen content within the range of 0.1 to 2.0%.

16. A laminar structure comprising a layer of organic polymeric material firmly adhered to a substrate by means of an interlayer therebetween of an adhesive composition comprising an aminoester modified vinyl addition polymer, of at least two ethylenically unsaturated copolymerizable monomers, having attached to the carbon-carbon chain thereof monovalent radicals of the formula:

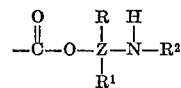

wherein
Z is an aliphatic hydrocarbon radical of from 2 to 3 carbon atoms,
R and $R^1$ are selected from the group consisting of hydrogen and alkyl radicals of from 1 to 8 carbon atoms, and
$R^2$ is selected from the group consisting of hydrogen and non-tertiary alkyl radicals of from 1 to 8 carbon atoms; said monovalent radicals being present in an amount to provide an amino nitrogen content within the range of about 0.01 to 6.5% based on the weight of the vinyl polymer.

17. The laminar structure of claim 16 wherein said aminoester modified vinyl addition polymer is an acrylic-ester polymer having an amino nitrogen content of between about 0.01 and 6.5% by weight, based upon the total weight of said aminoester modified vinyl addition polymer.

18. The laminar structure of claim 16 wherein the organic polymeric material is polyvinyl fluoride.

19. The laminar structure of claim 16 wherein the organic polymeric material is a polyimide.

20. The laminated structure of claim 16 wherein the substrate is a metallic substrate.

21. The laminated structure of claim 16 wherein the substrate is a cellulosic substrate.

22. The laminated structure of claim 16 wherein the substrate is cementitious substrate.

23. An article of manufacture comprising a layer of organic polymeric material having a coating on at least one surface thereof of an adhesive composition comprising an aminoester modified vinyl addition polymer, of at least two ethylenically unsaturated copolymerizable monomers, having attached to the carbon chain thereof monovalent radicals of the formula:

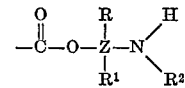

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen and alkyl radicals of from 1 to 8 carbon atoms, and $R^2$ is selected from the group consisting of hydrogen and non-tertiary alkyl radicals of from 1 to 8 carbon atoms, said vinyl polymer having an amino nitrogen content of at least 0.1% by weight, based upon the total weight of said vinyl polymer.

24. The article of claim 23 wherein said aminoester modified vinyl addition polymer is an acrylic-ester polymer having an amino nitrogen content of between about 0.1% and about 6.5% by weight, based on the total weight of said aminoester modified vinyl polymer.

25. The article of claim 23 wherein the organic polymeric material is polyvinyl fluoride.

26. The article of claim 23 wherein the organic polymeric materials is a polyimide.

27. A laminated structure comprising a substrate, a preformed layer of polyvinyl fluoride film at least one surface of which has been chemically activated and, between said substrate and said activated surface, a layer of an adhesive composition comprising a vinyl addition polymer of methacrylic acid with at least one other ethylenically unsaturated copolymerizable monomer and having attached to the carbon-carbon chain monovalent radicals selected from the group consisting of:

(a)
$$-\overset{O}{\underset{\|}{C}}-O-CH_2-CH_2-NH_2$$

(b)
$$-\overset{O}{\underset{\|}{C}}-O-CH_2-\underset{\underset{CH_3}{|}}{CH}-NH_2$$

(c)
$$-\overset{O}{\underset{\|}{C}}-O-\underset{\underset{CH_3}{|}}{CH}-CH_2-NH_2$$

said monovalent radicals being present in an amount to provide an amino nitrogen content within the range of about 0.1 to 2.0% based on the weight of the addition polymer.

28. A structure comprising a preformed layer of polyvinyl fluoride film having one surface chemically activated and a coating on said surface of a vinyl addition polymer of methacrylic acid with at least one other vinyl monomer having attached to the carbon-carbon chain monovalent radicals selected from the group consisting of:

(a)
$$-\overset{O}{\underset{\|}{C}}-O-CH_2-CH_2-NH_2$$

(b)
$$-\overset{O}{\underset{\|}{C}}-O-CH_2-\underset{\underset{CH_3}{|}}{CH}-NH_2$$

and
(c)
$$-\overset{O}{\underset{\|}{C}}-O-\underset{\underset{CH_3}{|}}{CH}-CH_2-NH_2$$

said monovalent radicals being present in an amount to provide an amino nitrogen content within the range of about 0.1 to 2.0% based on the weight of the addition polymer.

29. A polymer comprising an aminoester modified vinyl addition polymer of methacrylic acid and methyl methacrylate having an amino nitrogen content of at least 0.01% by weight and having attached to the carbon-carbon chain monovalent radicals selected from the group consisting of:

(a)
$$-\overset{O}{\underset{\|}{C}}-O-CH_2-CH_2-NH_2$$

(b)
$$-\overset{O}{\underset{\|}{C}}-O-CH_2-\underset{\underset{CH_3}{|}}{CH}-NH_2$$

and
(c)
$$-\overset{O}{\underset{\|}{C}}-O-\underset{\underset{CH_3}{|}}{CH}-CH_2-NH_2$$

30. A coating composition based on methacrylate polymer containing at least about 50 percent by weight of lower alkyl methacrylate in polymerized form, said composition containing at least about 0.072 percent by weight, based upon the weight of methacrylate polymer, of vinyl polymerized carboxylic acid units which have been reacted with an imine of the formula:

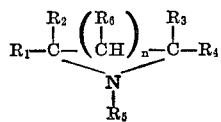

where $R_1$, $R_2$, $R_3$, $R_4$ and $R_5$ are each selected from the group consisting of hydrogen and alkyl and $R_6$ is selected from the group consisting of hydrogen and lower alkyl, and $n$ is an integer from 0 to 1.

31. The coating composition of claim 30 in which said lower alkyl methacrylate is methyl methacrylate.

32. The coating composition of claim 30 in which said acid units are derived from an ethylenically unsaturated acid of from 3 to 6 carbon atoms and from 1 to 2 carboxyl groups, and said imine is an ethylenimine or 1,2-propylenimine.

33. An interpolymer which contains (1) from about 50 percent to about 99 percent by weight of methyl methacrylate, (2) from about 1.0 percent to about 10 percent by weight of ethylenically unsaturated carboxylic acid having 3 to 6 carbon atoms and 1 to 2 carboxyl groups, and (3) from about 0 percent to about 49 percent by weight of at least one other ethylenically unsaturated monomer copolymerizable with methyl methacrylate and said acid, said interpolymer having the acidic carboxyl groups thereof reacted with an ethylenimine or 1,2-propylenimine.

34. A coated article comprising a solid substrate having thereon an adherent layer of the coating composition of claim 30.

35. A coated article comprising a solid substrate having thereon an adherent layer of a coating composition in which the film-forming component comprises the interpolymer of claim 33.

36. A coating composition comprising a vinyl addition polymer of at least two ethylenically unsaturated copolymerizable monomers, said composition containing at least about 0.072 percent by weight, based upon the weight of the vinyl addition polymer, of vinyl polymerized carboxylic acid units which have been reacted with an imine of the formula:

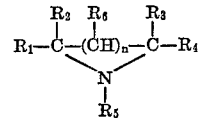

where $R_1$, $R_2$, $R_3$ and $R_5$ are each selected from the group consisting of hydrogen and alkyl, $R_6$ is selected from the group consisting of hydrogen and lower alkyl, and $n$ is an integer from 0 to 1.

37. The coating composition of claim 36 in which said vinyl addition polymer is methyl methacrylate.

38. The coating composition of claim 36 in which said acid units are derived from an ethylenically unsaturated acid of from 3–6 carbon atoms and from 1–2 carboxyl groups, and said imine is an ethylenimine or 1,2-propylenimine.

39. A coated article comprising a solid substrate having thereon an adherent layer of the coating composition of claim 36.

References Cited
UNITED STATES PATENTS 3,157,562   11/1964   Kine et al.
3,133,854   5/1964    Simms.

MURRAY TILLMAN, Primary Examiner

C. SECCURO, Assistant Examiner

U.S. Cl. X.R.

117—161 UN, 161 UR, 138.8 UF; 156—331; 161—204, 205, 219, 227, 248, 249, 251, 254; 260—31.2 N, 32.8 N, 33.4 R, 33.6 UA, 33.8 UA, 41 A, 41 B, 41 C, 41 R, 80.3 N, 86.1 N, 80.72, 881 PN